United States Patent [19]
Dasgupta et al.

[11] Patent Number: 6,080,508
[45] Date of Patent: Jun. 27, 2000

[54] PACKAGING ASSEMBLY FOR A LITHIUM BATTERY

[75] Inventors: Sankar Dasgupta; James K. Jacobs, both of Toronto, Canada

[73] Assignee: Electrofuel Inc., Toronto, Canada

[21] Appl. No.: 09/032,780

[22] Filed: Mar. 6, 1998

[51] Int. Cl.$^7$ .................................................. H01M 2/06
[52] U.S. Cl. ............................ 429/127; 429/163; 429/211
[58] Field of Search ....................... 429/162, 163, 429/211, 127, 100, 231.95

[56] References Cited

U.S. PATENT DOCUMENTS

| | | | |
|---|---|---|---|
| 2,870,235 | 1/1959 | Soltis . | |
| 2,995,614 | 8/1961 | Krueger . | |
| 3,026,365 | 3/1962 | Hughes et al. . | |
| 4,092,464 | 5/1978 | Dey et al. ............................... | 429/127 |
| 4,664,994 | 5/1987 | Koike et al. ............................ | 429/163 |
| 4,997,732 | 3/1991 | Austin et al. .......................... | 429/153 |
| 5,227,264 | 7/1993 | Duval et al. ........................... | 429/153 |
| 5,326,652 | 7/1994 | Lake ...................................... | 429/127 |
| 5,326,653 | 7/1994 | Chang .................................... | 429/162 |
| 5,445,856 | 8/1995 | Challoner-Gill ....................... | 428/35.9 |
| 5,591,540 | 1/1997 | Louie et al. ............................ | 429/163 |

FOREIGN PATENT DOCUMENTS 60-211763  10/1985  Japan .

*Primary Examiner*—Maria Nuzzolillo
*Assistant Examiner*—Susy Tsang

[57] ABSTRACT

The terminals of a thin plate rechargeable lithium battery are coated with a heat-sealable polymer. The coating forms a band on each face of the terminals and the band is heat-sealed to the inner insulator layers of a multi-layered polymer laminate enclosing the thin plate rechargeable lithium battery at a location close to an open edge of the insulator layer. Small sheets of rigid, high melting point, polymeric materials are inserted between the bands of coating carried by the terminals and the edge of the multi-layered laminate enclosing the lithium battery. A portion of the sheets of polymeric material is adhesively attached to the face of the terminal adjacent the bands of coating. The open edges of the multi-layered polymer laminate enclosure are subsequently sealed to enclose completely the thin plate lithium battery.

14 Claims, 1 Drawing Sheet

PACKAGING ASSEMBLY FOR A LITHIUM BATTERY

FIELD OF INVENTION

This invention is related to rechargeable non-aqueous lithium batteries.

BACKGROUND OF THE INVENTION

Rechargeable lithium batteries are light and are in commercial demand by the electronic industry as a high density energy source. Most rechargeable lithium batteries have a negative electrode or anode containing elemental lithium, either as lithium metal or lithium alloy, or more often intercalated in some form of carbon or in a compound capable of intercalating lithium ions. The rechargeable lithium battery also has a positive electrode or cathode containing a substance, usually a chalcogenide, capable of incorporating lithium in its structure, as the positive active component, a non-aqueous electrolyte which is conductive of lithium ions, and a pair of current collectors in contact with the anode and the cathode, respectively. The rechargeable lithium battery may also include separators to separate the electrodes from one another electrically. Rechargeable lithium batteries are usually sensitive to atmospheric oxidation and humidity, in other words, to maintain their electrical efficiency lithium batteries have to be protected from atmospheric oxygen, moisture and other corrosive reagents which may be detrimental to lithium ions.

There are known methods of providing protection for lithium batteries from oxidation, such as for example, encasing the battery in a metal container, or inserting the battery between rigid metal plate current collectors or in some instance between metallic foil current collectors, and placing a tight insulator frame around the periphery of the battery, thereby sealing and protecting the lithium battery from atmospheric corrosion.

Electrochemical cells sealed in flexible polymer containers are described in U.S. Pat. No. 4,092,464 issued to A. N. Dey et al. on May 30, 1978. The electrochemical cells of Dey et al. have lithium metal anodes and silver chromate cathodes, each electrode being sealed in an ionically conducting polymer pouch and having a terminal egressing from the pouch. The enclosed electrodes are placed in a polymer laminate bag which is subsequently filled with non-aqueous electrolyte. The terminals carry a coating of heat-sealable material which permits the formation of a seal between the polymer laminate bag and the terminals. Rechargeable lithium batteries are frequently made in the shape of thin film or thin plate batteries which are wrapped in a flexible multi-layered polymer laminate. There are several known laminated packaging materials composed of layers impervious to oxygen and/or moisture, which have been utilized in packaging and protecting lithium batteries from damage caused by oxidation, such as for example, those described in U.S. Pat. No. 5,326,652 issued to R. C. Lake on Jul. 5, 1994, and U.S. Pat. No. 5,591,540 issued to Louie et al. on Jun. 7, 1997. Thin plate rechargeable lithium batteries are usually equipped with two electrically conducting extensions which are used as terminals for connecting the battery in serving as a power source, as well as for charging the battery. None of the above mentioned patents give detailed teachings with respect to the manner of sealing the terminals to the packaging laminate of the battery. R. A. Austin et al. in U.S. Pat. No. 4,997,732 which issued on Mar. 5, 1991, teach a lithium battery constructed of cells made of lithium foil anode, vanadium oxide cathode and a polymer electrolyte between them, enclosed in a moisture impervious multi-layered material having a heat-sealable polymer inner layer. The multi-layered material of Austin et al. may include another thermoplastic polymer, a metallic foil as a moisture and oxygen barrier, and an outer polymer protective layer. It is apparent that the laminate layers are sealed to one another and to the metallic current collector terminals of the packaged cell in a single process step. Austin et al. make brief reference to the need for adhesion between the surface of the metallic terminal and the heat sealable inner layer but provide no detailed instruction on how this is achieved. It is known that the polymer laminates can be durably bonded together by applying heat and pressure, however, the bond between the metal surface of the tabs or terminals and the polymer may not be sufficiently air-tight, and oxygen and/or moisture may enter at the metal-polymer interface into the battery package unless strong adherence between the metal and the plastic or polymer laminate can be implemented.

Another defect that may arise in conventionally packaged rechargeable lithium batteries, wherein the metal foil located between the protective layers comes in contact with one or both the metallic terminals or tabs resulting in an electrical short within the battery. Such defect may be caused by the heat sealing process diminishing the thickness of the polymer layer, or the sharp edges of the metal terminal may cut through to the enclosed metallic foil or by similar events.

SUMMARY OF THE INVENTION

There is a need to improve the performance of sealing of the polymer packaging of rechargeable lithium batteries to overcome the above described problems. In particular, there is a need for devising methods to avoid short circuiting the battery terminals by inadvertent contact with the protective metallic foil located within the packaging laminate layers. A protective battery packaging assembly has now been found for enclosing a thin plate rechargeable lithium battery which has an anode containing a negative active substance, a cathode containing a positive active substance, a non-aqueous electrolyte conductive of lithium ions, a first and a second current collector in contact with the anode and the cathode respectively, the current collectors are further having first and second elongated terminals, each elongated terminal having a width and a pair of opposing faces, and a band of adherent, electrically insulating coating deposited thereon. The bands of coating cover the width of the elongated terminals and are located adjacent the anode in contact with the first current collector and the cathode in contact with the second current collector, respectively. The battery packaging assembly enclosing the thin plate rechargeable lithium battery includes a multi-layered laminate enclosure, comprising at least one heat-sealable insulator inner layer, an external polymer layer and a metallic foil between the heat-sealable insulator inner layer and the external polymer layer. The multi-layered laminate enclosure has at least one pair of unsealed opposing edges capable of being heat-sealed to the bands of adherent electrically insulating coating on the elongated terminals of the enclosed thin plate rechargeable lithium battery extending between the unsealed edges. The battery packaging assembly further comprises rigid polymeric insulator sheets, each polymeric insulator sheet having width in excess of the width of the elongated terminal, a portion of which is adhesively attached to the face of the elongated terminal adjacent the distal end of the band of coating, and partially overlaying the band of adherent electrically insulating coating. The rigid polymeric insulator sheet extends between the band of coating and one of the unsealed edges of the multi-layered laminate. The heat-sealable inner insulator layers of the multi-layered laminate are heat-sealed to each band of adherent, electrically insulating coating on the elongated battery terminals in the proximity of the unsealed edges of multi-layered laminate enclosure and the sealing of the battery packaging is completed by heat-sealing all the unsealed opposing edges to one another.

DETAILED DESCRIPTION OF THE PREFERRED EMBODIMENTS

Figure 1A:
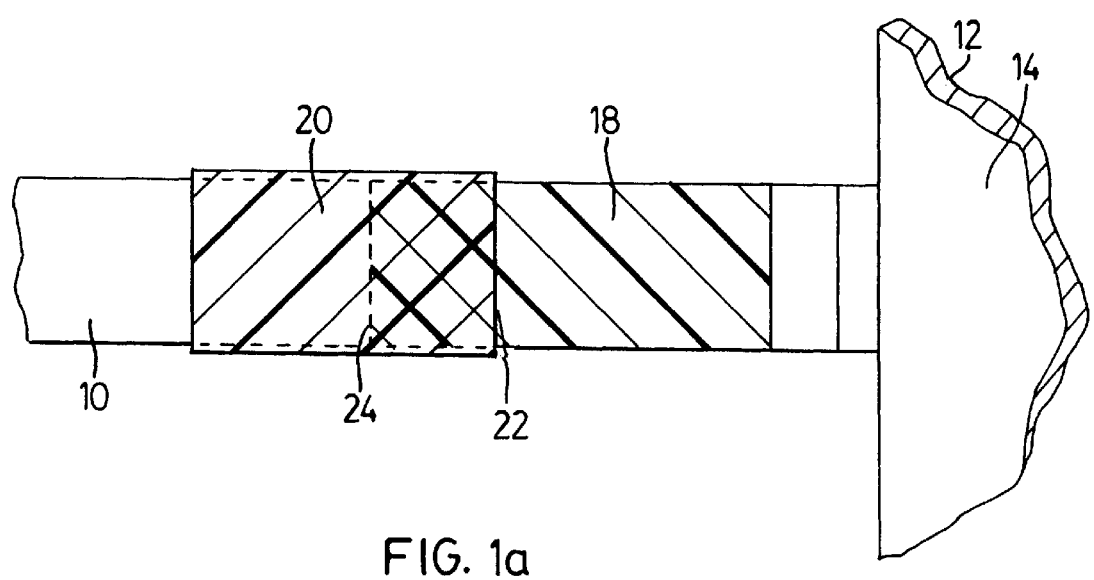
FIG. 1a is a schematic representation of the top view of one face of an elongated terminal of a current collector in accordance with the present invention.

Thin plate rechargeable lithium batteries are regarded as high density energy sources and have many applications and uses. Anodes of lithium batteries usually have a carbon compound capable of intercalating lithium ions, or other compounds which can perform the same function, as the negative active agent and other usual electrode components. The negative active component in some cases, may be lithium metal or a lithium containing alloy in the shape of a metal foil. Similarly, cathodes of lithium ion batteries contain a compound which can incorporate reversibly lithium ions in its structure, mixed with usual positive electrode components. A rechargeable lithium battery also has a non-aqueous electrolyte which is conductive of lithium ions. It is usual that the essential components of thin plate rechargeable lithium batteries are arranged such that the anode and the cathode are each in contact with a metallic current collector. The metallic current collectors have electrically conductive extensions, usually called terminals, which are designed to be connected to the equipment utilizing the energy provided by the thin plate rechargeable lithium battery, as well as for recharging the battery. The terminals are sometimes referred to as connecting electrodes or leads or tabs or connecting tabs, in the present description these will be referred to as electrical terminals, or simply, as terminals. The thin plate lithium batteries conveniently have quadrilateral shape but they could have any shape. The term quadrilateral is used here to include shapes having at least one curved side.

Lithium batteries are very sensitive to atmospheric oxidation and moisture, and are usually enclosed in some form of an air-tight container. Thin plate rechargeable lithium batteries are frequently enclosed and preferably air-tightly sealed, in a flexible multi-layered polymeric packaging material. As briefly discussed above, the multi-layered material for wrapping and enveloping a thin plate rechargeable lithium battery is usually composed of several polymer laminate layers but may additionally include organic and inorganic substances adhering to the surface of one or more of the polymer layers. The sequence of the polymer layers is not critical, but it is common that at least one of the polymer layers next to the thin plate rechargeable lithium battery, that is, the innermost layer is an electrically insulating, heat-sealable polymer, however, there may be more than one heat-sealable insulator inner layer included in the packaging. The type of polymer most frequently used as insulating, heat-sealable layer is high, medium or low density polyethylene and polypropylene, but other chemical equivalents such as polyethylene acrylate copolymers and polyethylene-methacrylic acid ionomers or similar compounds may also be used. The multi-layered packaging material often additionally includes a metallic foil, most frequently aluminum foil, but alloys of aluminum, copper, and similar readily machinable metals are also acceptable. The function of the metallic foil is to exclude oxygen and moisture, that is, to act as a barrier to oxidizing agents. It is common that the metal layer is deposited, laminated or extruded onto a polymer surface, which thereby becomes a carrier as well as a further barrier layer. It is preferred to have an additional thermoplastic polymer layer located on the external surface of the multi-layered laminate for packaging the battery to provide protection from mechanical damage, carry labels or printed identification marks, etc. Any thermoplastic polymer which can be laminated to thin layers may be utilized. The polymer layer, which carries the metallic foil on its inner face is most often, a thermoplastic polymer, performing the role of mechanical protection as well. Thus the multi-layered laminate comprises at least three layers but may have more than three.

The multi-layered laminates forming the packaging enclosure may be constructed from a pair of equally sized laminates or an elongated piece of laminate which has been folded. The multi-layered laminate enclosure for a thin plate rechargeable lithium battery is usually obtained by heat-sealing in a known manner one or two pairs of parallel edges of the folded multi-layered laminate, or two or three pairs of opposing edges of the equally sized laminates. In any of the above laminate enclosures, at least one pair of opposing edges of the multi-layered laminate enclosure is left unsealed. The lithium battery is placed in the obtained multi-layered laminate enclosure, having either two terminals extending between one pair of unsealed opposing laminate edges, or having one terminal extending between one pair of unsealed opposing edges and the other terminal extending between another pair of unsealed opposing edges of the multi-layered laminate enclosure. The terminals are subsequently sealed to the heat-sealable inner insulator layers close to the unsealed edges of the multi-layered laminate in a manner described hereinbelow. It is however, also possible to first proceed with the heat-sealing of the terminals to the inner heat-sealable polymer layer and proceed with the heat-sealing of the other edges for completely enclosing the lithium battery, subsequently. The sequence of the above steps is dictated by convenience only.

It has been found that for obtaining a thin plate rechargeable lithium battery satisfactorily sealed in its multi-layered package it is advantageous to coat a band of adherent, electrically insulating coating on each face of the metallic current collector terminal. It is of essence that the band of coating is strongly adherent to the metal surface of the terminal, as well as being able to interact to form a bond or weld with the inner insulating layer when heat-sealing is applied to it. The adherent band of coating is applied close to the area of contact of the current collector with the anode or the cathode of the lithium ion battery, along the entire width of the terminal and on both of its faces. The length or depth of the band of coating is dictated by convenience, but usually exceeds the width of the terminal, may even be two or three times the width. The most suitable polymer compounds for use as metal-adherent, heat-sealable, electrically insulating band of coating are ethylene-methacrylic acid copolymers, polyethylene-methacrylic acid ionomers and polyethylene, or other appropriate polyethylene or polypropylene derivatives. However, other chemical equivalents of these metal adherent electrically insulating compounds may be substituted for the above.

The temperature of the heat-sealing operation depends on the respective melting points of the adherent electrically insulating band of coating and the insulating polymer layer to which it is designed to be bonded, but it is conveniently between 90 and 140° C. In other words, the melting point of the electrically insulating inner layer of the multi-layered laminate and the polymer compound forming the coating on the battery terminals, is preferably less than 135° C., but at any rate, less than the heat-sealing temperature.

The current collectors of thin plate rechargeable lithium batteries are usually made of metallic sheets or foils, or a metallic mesh or grid. In some instances, electrically conductive polymers layers may be used. The object is to have a relatively large electrically highly conductive surface in contact with the electrode material. There are known solutions to this problem. The band of coating may be applied to an elongated metallic strip which is subsequently welded to the current collector, or the current collector may have an elongated piece or strip of the same metal extending from it and the band of coating is applied to the elongated piece of metal. Metallic current collectors are usually made of copper, nickel, aluminum, alloys of copper, nickel and aluminum, and stainless steel. The electrical terminals are most frequently a metallic strip of copper, nickel, aluminum and alloys of such. In some instances the terminal is stainless steel.

A piece of rigid, electrically insulating, polymeric or plastic sheeting, having width in excess of the width of the terminal, and length conveniently less than that of the band of adherent electrically insulating coating, is adhesively attached to the metal surface of the terminal, adjacent the band of coating on each face of each terminal, in such a manner, that the portion of the rigid insulating plastic sheet not attached to the metal surface, overlaps the end of the band of coating which is away from the electrodes, and thereby overlays the band of adherent electrically insulating coating. The above arrangement is schematically shown on FIG.1a, which is a top view of one face of a metallic terminal strip 10. A fragment of the current collector 12, in contact with the battery electrode, that is with anode or cathode 14, is shown joined to the metallic terminal strip 10. The terminal strip 10 may be an extension of the current collector 12, or optionally, may be welded to the current collector at seam 16. It is noted that weld seam 16, is required only if the terminal and the current collector are not a unitary piece. Adjacent the anode or cathode 14, or the optional weld seam 16, is the band of adherent electrically insulating coating 18, having distal end shown by broken line 24. The rigid polymeric insulator sheet 20, is partially overlaying the band of adherent insulating coating 18. The portion of the rigid insulator sheet 20, which overlays the band 18, is shown to extend between band end 24, and rigid polymeric insulator sheet end 22. The first portion of the rigid polymeric insulator sheet 20, is adhesively attached to the metallic terminal strip 10, by conventional methods. Preferably, the rigid insulator sheet is made of a polyimide compound, known commercially as "Kapton" and manufactured by the Dupont Company. Teflon (PTFE), rigid polyesters, nylon, high density polypropylene, polyvinylidene fluoride and other high melting point polymers or copolymers may be substituted for the polyimide compound. In some instances, a small sheet of varnished or polymer coated stiff paper may also be utilized as a rigid insulator sheet. Preferably, the polymer used in the rigid insulator sheet has a melting point in excess of 145° C., and in any case, at least 10° C. higher than the temperature of the heat-sealing process step.

The adherent electrically insulating band of coating is obtained by usual coating methods or by extrusion. The terminal strip is coated prior to enveloping the thin plate rechargeable lithium battery in the multi-layered laminate. The rigid insulator sheet is attached adhesively to the terminal strip subsequent to providing the band of coating.

Figure 1B:
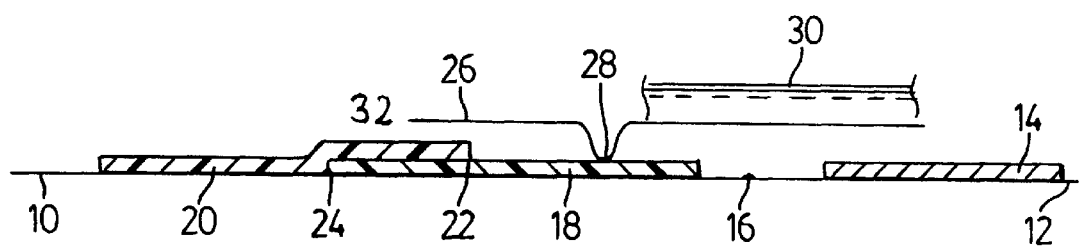
FIG. 1b is a schematic drawing of the side view of a section of the multi-layered laminate heat-sealed to the band of adherent electrically insulating coating located on one face of the elongated battery terminal.

The heat-sealable polymeric insulator layer which is usually the innermost layer of the multi-layered laminate enveloping the lithium ion battery, is sealed to the band of adherent electrically insulating coating in a continuous sealing weld between the band-end adjacent the electrode (i.e.anode or cathode) and the overlaying portion of the rigid polymeric insulating sheet. FIG. 1b is a schematic side view of one face of the metallic terminal strip 10, showing a fragment of the heat-sealable inner insulator polymer layer 26, having been sealed to the band of adherent coating 18, at sealing weld 28. The length by which the heat-sealable insulator layer extends beyond the sealing weld is dictated by convenience, but it is noted that the sealing weld 28, sealing the heat-sealable layer to the band of adherent electrically insulating coating is located close to the unsealed edge 32, of the multi-layered laminate. Fragments of the other insulating and protecting layers comprised in the multi-layered laminate 30, are shown schematically, however, it is to be understood, that all the other layers extend to the unsealed edge 32. The full length of the other layers has been omitted in FIG.1b merely to present a clear view of the formation of sealing weld 28. It is further noted that multi-layered laminate 30, including heat-sealable inner insulator layer 26, extends in the other direction to enclose the rest of the rechargeable lithium battery. The overlaying portion of rigid insulating polymeric sheet 20, is shown to be located between the band of adherent insulating coating 18, and the heat-sealable polymer layer 26. Like members of FIG. 1a are represented by like numerals.

To obtain a completely packaged and sealed thin plate rechargeable lithium battery all the opposing unsealed edges of the multi-layered laminate enclosure are sealed to one another. Such final sealing step may take place at the same time as the heat-sealable layers are sealed to the bands of coating carried by the terminals or subsequently. The length of the battery terminal extending from the packaged and sealed rechargeable lithium battery is dictated by convenience.

The rigid polymeric insulating sheet attached to one face of the metallic terminal strip may be joined at its side edges extending the width of the terminal to the rigid polymeric sheet on the opposing face of the terminal strip, thereby forming a sleeve of rigid polymeric insulator.

EXAMPLE

A 7 mm wide strip of nickel, having 125 $\mu$m thickness, was coated by usual methods on both its faces with polyethylene-methacrylate to form a 21 mm long band. A 10 mm long and 8 mm wide Kapton sheet was adhesively attached to each face of the strip next to one end of the polyethylene-methacrylate end of the polyethylene-methacrylate band of coating, in such a manner that about half of the 10 mm long Kapton sheet overlays the polyethylene-methacrylate band. The nickel strip was subsequently welded at the end opposing the end bearing the Kapton sheets on both faces, to a copper sheet which was bearing a 150 $\mu$m thick layer of graphite containing conventional lithium battery anode mixture. A lithium ion containing solid polymer electrolyte layer was placed on top of the anode layer. A cathode layer containing lithiated cobalt oxide as positive active material was coated on an aluminum sheet in 150 $\mu$m thickness, and a 7 mm wide, 140

μm thick strip of aluminum having similar bands of coating of polyethylene-methacrylate and similar Kapton sheets attached adhesively to the strip, was welded to the cathode mixture carrying aluminum sheet. A thin plate rechargeable lithium battery of dimensions 110 mm by 120 mm, consisting of a graphite containing anode, a lithium ion containing solid polymer electrolyte and a lithiated cobalt oxide bearing cathode sandwiched between similar sized copper and aluminum sheets, having nickel and aluminum terminals as described above, each terminal carrying a band of polyethylene-methacrylate coating and a partially overlaying rigid Kapton sheet on both of its faces, was constructed. The thin plate lithium battery was subsequently enveloped in a multi-layered folded polymer laminate, which was first heat-sealed at one pair of opposing parallel edges, thus providing an enclosure with two sides closed. One of the two lithium battery terminals was extending between each pair of unsealed edges located at opposing sides of the multi-layered laminate enclosure. The multi-layered laminate consisted of a medium density polyethylene inner insulator layer, a high density polyethylene external layer, and an aluminum foil deposited on the inner face of the high density polyethylene external layer, thus the aluminum barrier layer was located between the medium and high density polyethylene layers. The layer thickness of each polyethylene layer was close to 25 μm. Appropriate sections of the inner facing layers of the multi-layered polyethylene laminate close to the unsealed edges, were subsequently heat-sealed by usual manner, to the exposed, that is not overlain by Kapton, portions of the polyethylene-methacrylate bands of coating carried on the terminals. The unsealed edges on opposite sides of the multi-layered laminate enclosure enveloping the thin plate lithium battery were also sealed to one another. A thin plate rechargeable lithium battery packaged and sealed in a multi-layered polyethylene laminate sheet was thereby obtained.

The above description of packaging and sealing a thin plate rechargeable lithium battery made of a single electrochemical cell can be extended to apply to the packaging of multi-cell lithium batteries. Such batteries are commonly made up of several lithium battery cells connected in parallel or in series, or located between a pair of single current collector sheets with electrodes mounted on the collectors in parallel arrangement and the array of cells folded to make a single battery having only two electrical terminals. The folded array of electrodes having lithium ion containing solid polymer electrolyte between the electrodes, or multi-cell arrangements having several terminals can be packaged and the terminals heat-sealed to the heat-sealable laminate layers in a manner very similar to that described in detail hereinabove.

Although the present invention has been described with reference to the preferred embodiment, it is to be understood that modifications and variations may be resorted to without departing from the spirit and scope of the invention, as those skilled in the art will readily understand. Such modification and variations are considered to be within the purview and scope of the invention and the appended claims.

We claim:

1. A battery packaging assembly for enclosing at least one lithium battery, comprising:
   i) a thin plate rechargeable lithium battery having an anode containing a negative active substance, a cathode containing a positive active substance, a non-aqueous electrolyte conductive of lithium ions, a first current collector and a second current collector in contact with said anode and said cathode respectively, said first and said second current collectors having first and second elongated terminals, each elongated terminal having a width and a pair of opposing faces, and each of said first and second elongated terminals having a band of adherent electrically insulating coating covering said width of said elongated terminals on each of said opposing faces, said band of adherent electrically insulating coating being located, respectively, adjacent said anode in contact with said first current collector and said cathode in contact with said second current collector, and said band of adherent electrically insulating coating having a distal end;
   ii) a multi-layered laminate comprising at least one heat-sealable inner insulator layer, an external polymer layer and a metallic foil located between the heat-sealable inner insulator layer and the external polymer layer, said multi-layered laminate forming an enclosure around said thin plate rechargeable lithium battery, said enclosure having at least one pair of unsealed opposing edges and at least one pair of sealed opposing edges, and said elongated terminals extending between said at least one pair of unsealed opposing edges, wherein said at least one heat-sealable inner insulator layer is heat-sealed to said band of adherent electrically insulating coating; and
   iii) a rigid polymeric insulator sheet, having width in excess of said width of said elongated terminal, a first portion of said rigid polymeric insulator sheet being adhesively attached to said face of said elongated terminal adjacent said distal end of said band of adherent electrically insulating coating, a second portion of said rigid polymeric insulator sheet overlaying said distal end of said band of adherent insulating coating, whereby said rigid polymeric insulator sheet extends between said at least one unsealed edge of said multi-layered laminate enclosure and said band of adherent electrically insulating coating.

2. A battery packaging assembly for enclosing at least one lithium battery as claimed in claim 1, wherein said rigid polymeric insulator sheet having said first portion adhesively attached to one of a opposing faces of said elongated terminal, is joined to a rigid polymeric insulating sheet adhesively attached to the other opposing face of said elongated terminal, thereby forming a rigid polymeric insulator sleeve extending between said at least one pair of unsealed opposing edges of said multi-layered laminate enclosure and said band of adherent electrically insulating coating on each of said opposing faces of said elongated terminal.

3. A battery packaging assembly for enclosing at least one lithium battery as claimed in claim 1, wherein said first and second current collectors are made of a metal selected from the group consisting of copper, nickel, aluminum and alloys thereof, and stainless steel.

4. A battery packaging assembly for enclosing at least one lithium battery as claimed in claim 1, wherein said first and second elongated terminals of said first and second current collector is made of a metal selected from the group consisting of copper, nickel, aluminum and alloys thereof.

5. A battery packaging assembly for enclosing at least one lithium battery as claimed in claim 1, wherein said band of adherent electrically insulating coating is made of a compound selected from the group consisting of ethylene-methacrylic acid copolymer, polyethylene-methacrylic acid ionomer and polyethylene.

6. A battery packaging assembly for enclosing at least one lithium battery as claimed in claim 1, wherein said at least one heat-sealable inner insulator layer is a polymer laminate selected from the group consisting of polyethylene, polypropylene, polyethylene-methacrylic acid ionomers and polyethylene acrylate copolymers.

7. A battery packaging assembly for enclosing at least one lithium battery as claimed in claim 1, wherein said rigid polymeric insulator sheet is made of a compound selected from the group consisting of polyimide, polyether ketone, teflon nylon, polyester, polyvinylidene fluoride and polyvinylidene copolymers.

8. A battery packaging assembly for enclosing at least one lithium battery as claimed in claim 1, wherein said metallic foil located between said heat-sealable inner insulator layer and said external polymer layer is aluminum.

9. A battery packaging assembly for enclosing at least one lithium battery as claimed in claim 1, wherein said multi-layered laminate enclosure is quadrilateral having three pairs of sealed opposing edges and one pair of unsealed opposing edges.

10. A battery packaging assembly for enclosing at least one lithium battery as claimed in claim 1, wherein said multi-layered laminate enclosure is formed by folding an elongated multi-layered laminate having parallel edges and sealing two pairs of opposing parallel edges, thereby having three closed edges and one pair of unsealed opposing edges.

11. A battery packaging assembly for enclosing at least one lithium battery as claimed in claim 1, wherein said multi-layered laminate enclosure is quadrilateral having two pairs of sealed opposing edges and two pairs of unsealed opposing edges.

12. A battery packaging assembly for enclosing at least one lithium battery as claimed in claim 1, wherein said multi-layered laminate enclosure is formed by folding an elongated multi-layered laminate having parallel edges and sealing one pair of opposing edges, thereby having two closed edges and two pairs of unsealed opposing edges.

13. A battery packaging assembly for enclosing at least one lithium battery as claimed in claim 1, wherein the temperature of heat-sealing said heat-sealable inner insulator layer to said band of adherent electrically insulating coating is lower than the melting point of said rigid polymeric insulator sheet.

14. A method of packaging at least one thin plate rechargeable lithium battery in a battery packaging assembly, said thin plate rechargeable lithium battery having an anode containing a negative active substance, a cathode containing a positive active substance, a non-aqueous electrolyte conductive of lithium ions, a first current collector and a second current collector in contact with said anode and said cathode respectively, said current collectors having first and second elongated terminals, each elongated terminal having a width and a pair of opposing faces, comprising the steps of:

i) coating a band of adherent electrically insulating polymer compound on each opposing face of each elongated terminal adjacent said anode in contact with said first current collector, and said cathode in contact with said second current collector, respectively, said band of coating extending the width of said elongated terminal, said band of adherent electrically insulating coating having a distal end;

ii) adhesively attaching a first portion of a rigid polymeric insulator sheet to each opposing face of each elongated terminal adjacent said distal end of said band of adherent electrically insulating coating, said rigid polymeric insulator sheet exceeding the width of said elongated terminal, whereby said distal end of said band of adherent electrically insulating coating is overlain by a second portion of said rigid polymeric insulator sheet;

iii) placing said thin plate rechargeable lithium battery in a multi-layered laminate enclosure, said multi-layered laminate including at least one heat-sealable inner insulator layer, an external polymer layer and a metallic foil located between the heat-sealable inner insulator layer and the external polymer layer, said multi-layered laminate enclosure having at least one pair of unsealed opposing edges, such that said elongated terminals of said thin plate rechargeable lithium battery extend between said at least one pair of unsealed opposing edges;

iv) heat-sealing said at least one heat-sealable inner insulator layer to said band of adherent electrically insulating coating, thereby obtaining a heat-seal weld in the proximity of said at least one unsealed edge of said multi-layered laminate enclosure, such that the overlaying portion of said rigid polymeric insulator sheet extends adjacent to said heat-seal weld between said band of adherent electrically insulating coating and said at least one unsealed edge of said multi-layered laminate enclosure, said rigid polymeric insulator sheet extending between said at least one unsealed edge and said band of adherent electrically insulating coating; and, v) heat-sealing said unsealed opposing edges to one another, thereby completely enclosing said thin plate lithium battery in said multi-layered laminate enclosure.

* * * * *